United States Patent [19]
Aquilina

[11] Patent Number: 5,037,235
[45] Date of Patent: Aug. 6, 1991

[54] ADJUSTABLE SHAFT FOR AN IMPLEMENT AND METHOD OF USING THE SAME

[76] Inventor: Paul Aquilina, 1857 Old Mill Rd., Kitchener, Ontario, Canada, N2P 1E3

[21] Appl. No.: 390,305

[22] Filed: Aug. 7, 1989

[51] Int. Cl.$^5$ .............................................. F16B 2/02
[52] U.S. Cl. ................................... 403/290; 403/301
[58] Field of Search ............... 403/290, 289, 299, 301, 403/342, 329, 371

[56] References Cited

U.S. PATENT DOCUMENTS

| | | | |
|---|---|---|---|
| 2,279,324 | 4/1942 | Pallen | 403/290 X |
| 3,380,097 | 4/1968 | Pharris | 403/301 X |
| 4,277,197 | 7/1981 | Bingham | 403/342 X |
| 4,524,484 | 6/1985 | Graham | 403/290 X |
| 4,541,139 | 9/1985 | Jones et al. | 403/290 X |
| 4,623,277 | 11/1986 | Wayne et al. | 403/371 X |
| 4,642,837 | 2/1987 | Nichols et al. | 403/290 X |

*Primary Examiner*—Peter M. Cuomo

[57] ABSTRACT

An adjustable shaft for an implement which can be increased or decreased in length and can be oriented in a number of ways which change the alignment of the handle end of the implement relative to the operating end of the implement is disclosed. The adjustable shaft comprises a first shaft and a second shaft of lesser diameter. The first shaft is hollow and the second shaft is slidably receivable therein. A mechanism for aligning the second shaft relative to the first shaft is attached to one end of the first shaft. The aligning mechanism includes a plurality of projections which extend away from the first shaft when the alignment mechanism is connected thereon. The projections are adapted to engage the second shaft. A collar member, which is slidable along the second shaft, engages with the projections of the alignment mechanism and presses them against the second shaft so that they frictionally engage the same. The length of the shaft may be adjusted by simply altering the length of the second shaft which is received inside the first shaft. The second shaft and the alignment mechanism are configured to interlock with each other so that rotational movement of the second shaft with respect to the first shaft is substantially prevented.

9 Claims, 4 Drawing Sheets

ADJUSTABLE SHAFT FOR AN IMPLEMENT AND METHOD OF USING THE SAME

BACKGROUND OF THE INVENTION

This invention relates generally to an adjustable shaft for an implement and more specifically to a shaft for an implement which can be increased or decreased in length and can be oriented in a number of ways to change the alignment of the handle end of the implement relative to the operating end of the implement.

SUMMARY OF THE INVENTION

The adjustable shaft of the present invention comprises a hollow first shaft and a second shaft of lesser diameter than the first shaft, which second shaft is slidably receivable within the first shaft. An alignment means is detachably connected to the first shaft, proximate one end thereof, and the alignment means has a plurality of projections which extend away from the first shaft when the alignment means is mounted thereon. The projections are adapted to engage the second shaft when the second shaft is received within the first shaft. A collar member is slidably mounted on the second shaft and is adapted to engage the alignment means so that it presses the projections of the alignment means against the second shaft when the second shaft is received in the first shaft. This detachably connects the first shaft and second shaft together and substantially prevents longitudinal movement of the second shaft with respect to the first shaft. The second shaft and the alignment means are also configured to interlock with each other so that rotational movement of the second shaft with respect to the first shaft is substantially prevented.

In the preferred embodiment of the invention, the first shaft has a plurality of holes proximate the end where the alignment means is connected. The alignment means has a plurality of catches for engaging in these holes, thereby connecting the alignment means to the first shaft. The alignment means can only be removed from the first shaft by following the steps of:
a) pushing the alignment means in a direction away from the end of the first shaft to which the alignment means is connected;
b) partially rotating the alignment means to prevent the catches from reengaging in the holes; and
c) pulling the alignment means off the end of the first shaft.

The external surface of the alignment means is threaded for engagement with the threaded internal surface of the collar member. The collar member is also internally tapered so that when it engages the projections of the alignment means, it presses the projections against the second shaft. This creates a frictional fit between the first and second shafts and substantially prevents longitudinal movement of the second shaft relative to the first shaft.

The second shaft is also provided with an internal longitudinal groove and the alignment means is provided with an internal longitudinal ridge for interlocking with the groove. This arrangement allows the second shaft to be inserted into the first shaft in such a manner that rotational movement of the second shaft relative to the first shaft is substantially prevented.

In the preferred embodiment of the invention, the alignment means comprises a first member which has catches which engage with the holes in the first shaft; a second member which connects to the first member; and a ring member which holds the first and second members in position on the first shaft.

The first member is threaded on its external surface for engagement with the internally threaded ring member; and the first member also has a plurality of teeth on one end thereof for engaging the second member. When the first member is connected to the first shaft, the teeth extend away from the first shaft.

The second member has a plurality of teeth on one end thereof for interlocking with the teeth of the first member. The second member also has a plurality of projections which are disposed on the opposite end of the second member from the teeth. The projections are adapted to engage the second shaft when it is inserted into the first shaft. The second member is also provided with an internal circumferential lip which rests on the end of the first shaft to which the alignment means is connected when the first member and second member are connected together and the catches of the first member are engaged in the holes of the first shaft. The lip allows the force applied to the second shaft to be transferred directly to the first shaft as opposed to allowing it to be applied to the first member of the alignment means. The second member is also provided with a ridge which interlocks with the groove on the second shaft so that the second shaft may only be received in the first shaft in a manner which substantially prevents rotational movement of the second shaft with respect to the first shaft. The orientation of the second shaft with respect to the first shaft may be varied by rotating the second member with respect to the first member so that different teeth on the first and second members interlock with each other. This causes the ridge in the second member to be rotationally shifted relative to the first member, which results in a change in the orientation of the second shaft relative to the first shaft when it is received in the first shaft. This feature may be value to obtain a different alignment of the handle end of the implement relative to the operating end, thus allowing the implement to be used in the most comfortable and efficient manner.

The length of the adjustable shaft may be increased by following the steps of:
a) disengaging the collar member from the alignment means so that it no longer presses the projections on the alignment means against the second shaft;
b) pulling the second shaft in a direction away from the end of the first shaft, to which the alignment means is connected, to the point that the desired length of shaft is obtained;
c) re-engaging the collar member with the alignment means so that it presses the projections on the alignment means against the second shaft and thereby secures the second shaft in the first shaft.

The length of the adjustable shaft of an implement using the disclosed invention may be decreased by following the steps of:
a) disengaging the collar member from the alignment means so that it no longer presses the projections on the alignment means against the second shaft;
b) pushing the second shaft in a direction towards the end of the first shaft, to which the alignment means is connected, to the point that the desired length of shaft is obtained;
c) re-engaging the collar member with the alignment means so that it presses the projections on the alignment means against the second shaft and thereby secures the second shaft in the first shaft.

The adjustable shaft may be assembled by following the steps of:
a) inserting the alignment means onto the first shaft and engaging the catches of the alignment means in the holes in the first shaft;
b) inserting the second shaft into the first shaft;
c) slidably moving the second shaft into the first shaft until the desired length of shaft is obtained;
d) slidably moving the collar member along the second shaft to engage with the alignment means;
e) engaging the collar member with the alignment member so that the collar member presses the projections against the second shaft.

The adjustable shaft may be disassembled by following the steps of:
a) disengaging the collar member from the alignment means;
b) withdrawing the second shaft from the first shaft.

BRIEF DESCRIPTION OF THE DRAWINGS

The preferred embodiment of the present invention will now be described with the aid of the following drawings in which.

DETAILED DESCRIPTION OF THE PREFERRED EMBODIMENT

Figure 1:
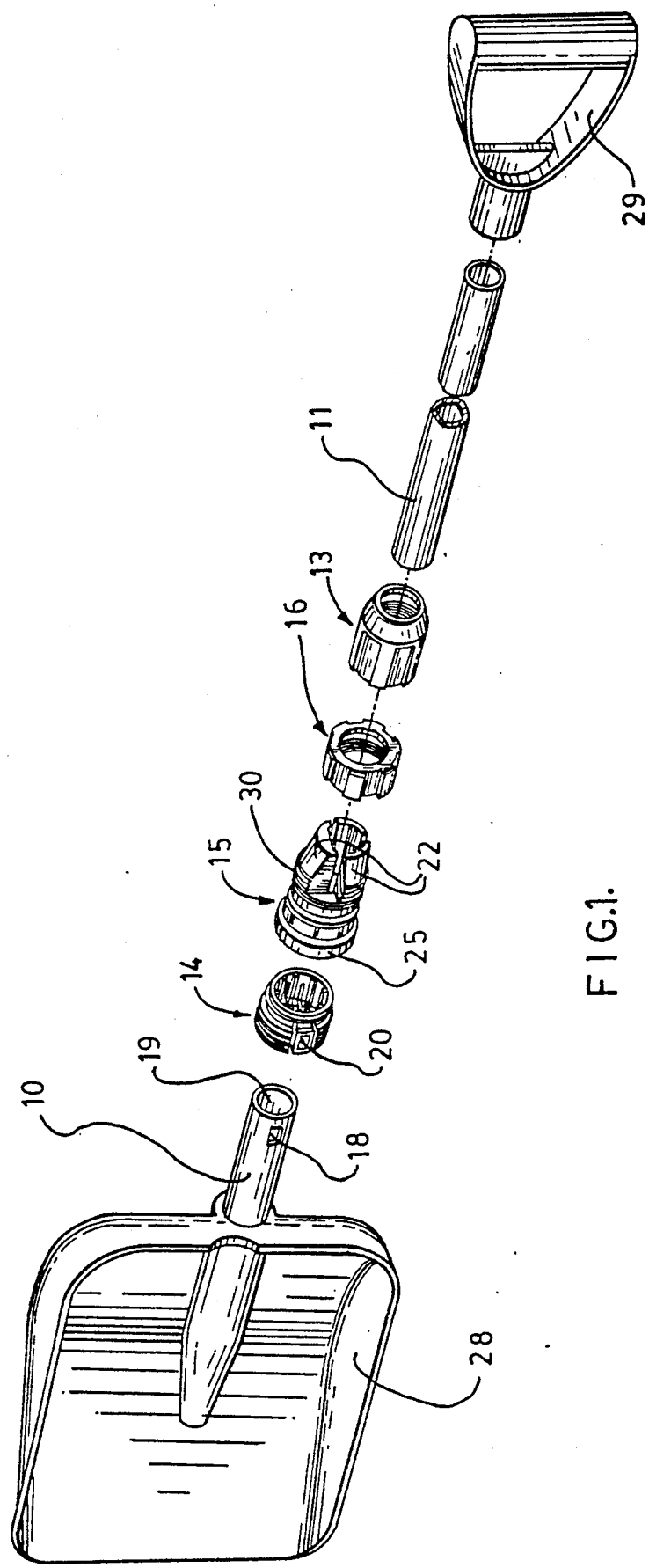
FIG. 1 is an exploded perspective view of the adjustable shaft of the present invention.
Figure 2:
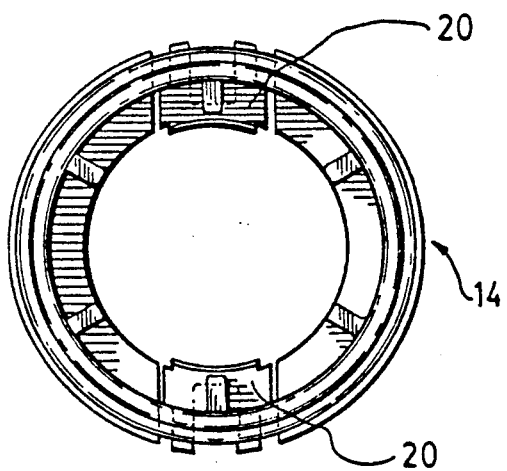
FIG. 2 is a bottom perspective view of the first member of the alignment means.
Figure 3:
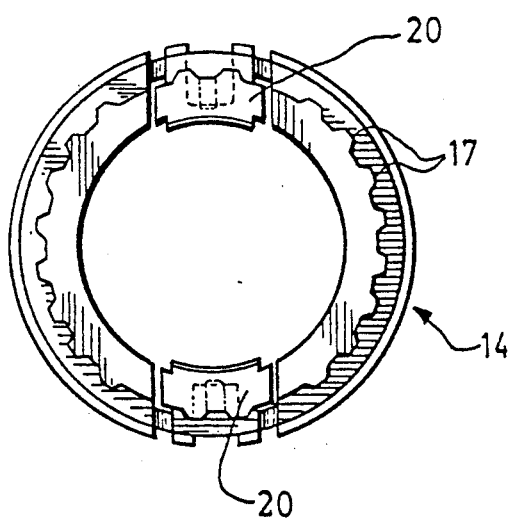
FIG. 3 is a top perspective view of the first member of the alignment means.
Figure 4:
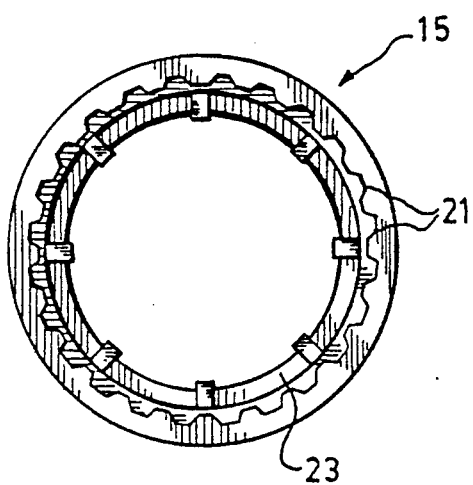
FIG. 4 is a bottom perspective view of the second member of the alignment means.
Figure 5:
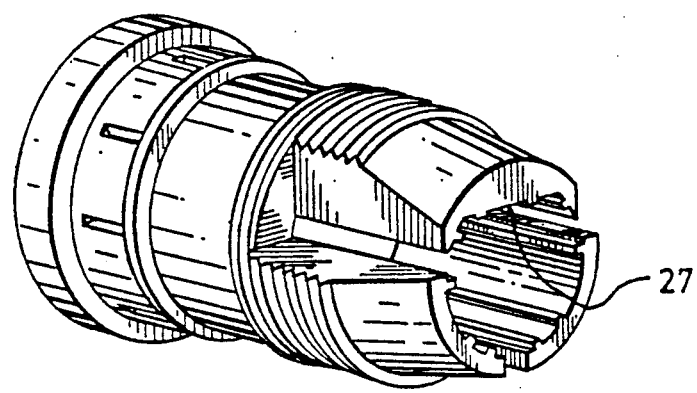
FIG. 5 is a top perspective view of the second member of the alignment means.
Figure 7:
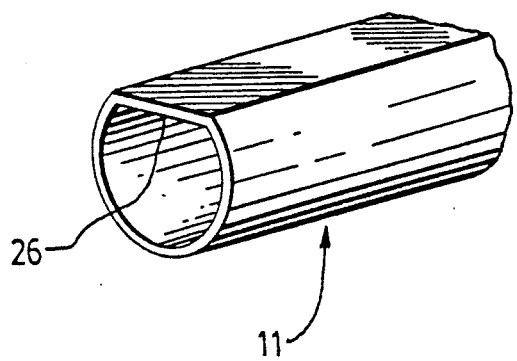
FIG. 7 is a bottom view of the second shaft showing the groove.
Figure 6:
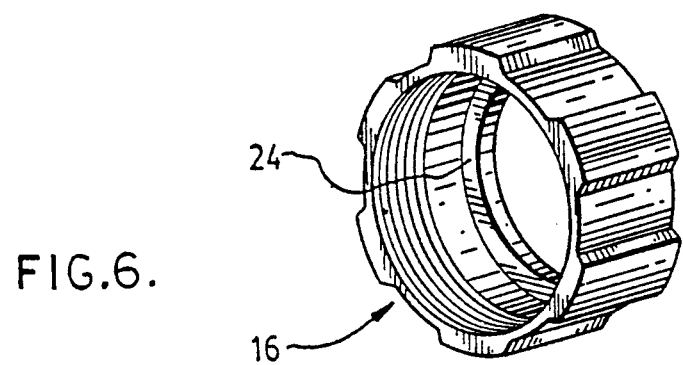
FIG. 6 is a bottom perspective view of the ring member.
Figure 8:
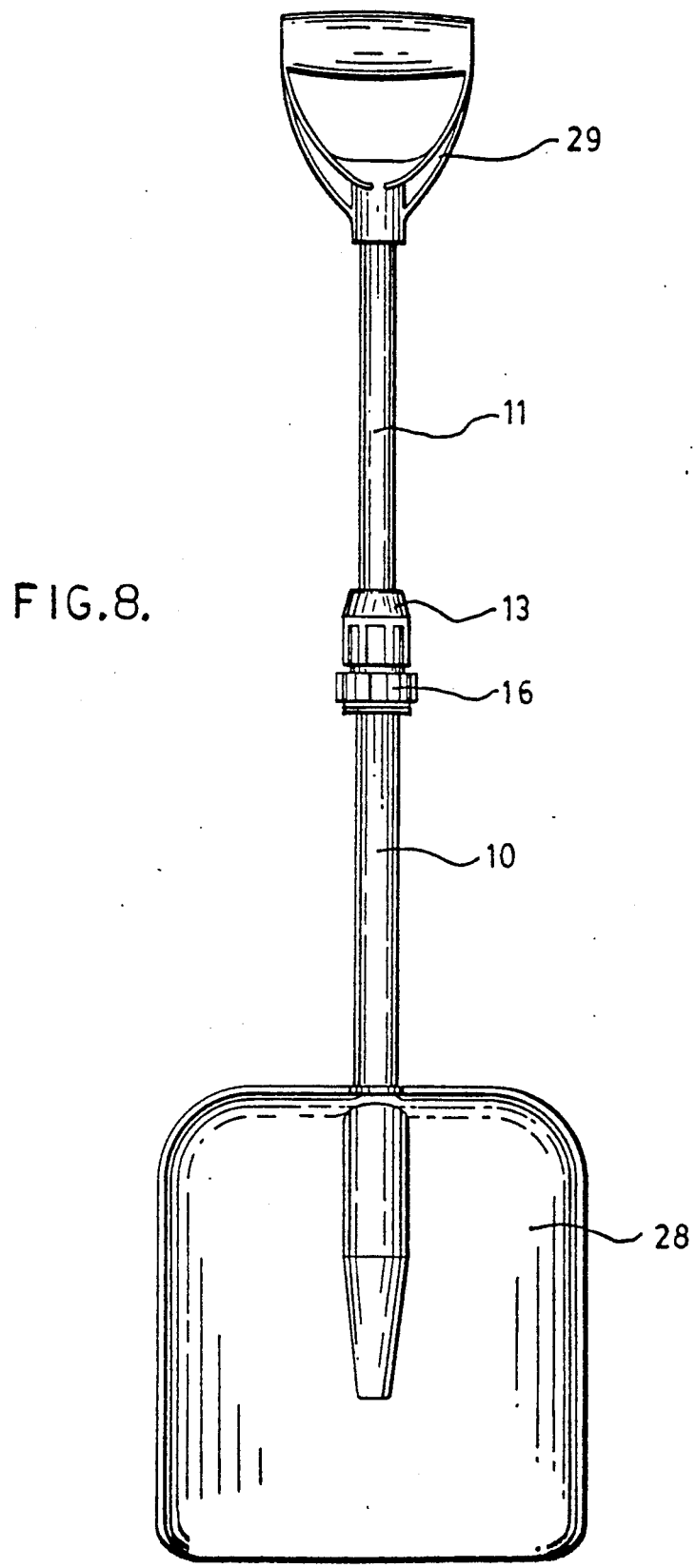
FIG. 8 is a front view of an implement in accordance with the present invention, showing the first and second shafts connected together.

Referring to the drawings, there is shown a first shaft 10 and a second shaft 11. The second shaft 11 is of lesser diameter than the first shaft 10. The first shaft is hollow and the second shaft is slidably receivable therein. A means, which is described below, is provided to detachably connect the second shaft to the first shaft. This means may be released and the length of the handle of the implement adjusted as required.

The first and second shafts are connected together by an alignment means, generally denoted by the number 12 and a collar member 13. The alignment means 12 comprises a first member 14, a second member 15 and a ring member 16 which connects the first and second members together.

The first member 14 is threaded on its external surface and has a plurality of teeth 17 at one end thereof. The first shaft 10 is provided with a plurality of holes 18 proximate the end 19 of the first shaft to which the first member 14 of the alignment means is connected. The first member has a plurality of catches 20 for engaging in the holes 18 of the first shaft 10. The catches 20 of the first member 14 engage the holes 18 in such a manner that the teeth 17 of the first member extend away from the first shaft 10, as is shown in FIG. 1. The first member may only be removed from the first shaft by following the steps of:
a) pushing the first member 14 in a direction shown by arrow A away from the end 19 of the first shaft 10;
b) partially rotating the first member 14 in a direction shown by either arrow B or C in FIG. 1, to prevent reenagement of the catches 20 in the holes 18;
c) removing the first member 14 from the first shaft 10 by pulling it off the end 19 of the first shaft 10 in the direction of arrow D in FIG. 1.

The second member 15 is provided with a plurality of teeth 21 on one end thereof for interlocking with the teeth 17 of the first member 14. The second member also has a plurality of projections 22 on the opposite end thereof from the teeth 21 for engaging the second shaft 11. A internal circumferential lip 23 is provided in the second member 15. The lip 23 rests on the end 19 of the first shaft when the first and second members are connected together and the catches 20 are engaged in the holes 18 in the first shaft 10. This lip 23 causes the force which is applied by the second shaft 11 to be directly transferred to the end 19 of the first shaft 10 as opposed to allowing it to be transferred to the first member 14 of the alignment means. This prevents premature damage to the first member 14.

The internally threaded ring member 16 is provided to secure the first and second members together when the teeth 17, 20 are interlocked. The ring member 16 threads onto the threaded external surface of the first member 14 and extends past a portion of the second member 15. The ring member not only secures the first member 14 to the second member 15, but it also keeps the catches 20 engaged in the holes 18 in the first shaft 10. The ring member 16 is provided with an internal circumferential rim 24 which engages with an external edge 25 on the second member 15. The engagement of the rim 24 and the edge 25 causes the ring member 16 to be disposed in the correct position to secure the first member 14 to the second member 15.

The second shaft 11 is provided with an internal longitudinal groove 26 which interlocks with an internal longtidunal ridge 27 disposed in the second member 15. The arrangement allows the second shaft 11 to be received in the first shaft in a manner which substantially prevents rotational movement of the second shaft 11 inside the second member 15. The second shaft 11 and the second member 15 may however be configured to interlock with each other in any manner which would substantially prevent rotational movement of the second shaft 11 with respect to the first shaft 10. For example, the second shaft 11 and second member 15 may be extruded so that they have interlocking hexagonal shapes.

The present invention may be applied to such implements as snow shovels and the like. The first shaft 10 may be connected to the shovel end 28 of the implement and the second shaft 11 may be connected to the handle end 29, as is shown in FIG. 1; or alternatively the second shaft 11 may be connected to the shovel end and the first shaft to the handle end of the implement. If it is desirable to alter the alignment of the handle end of the implement with respect to the shovel end, the orientation of the second shaft 11, and therefore the handle end 29, may be varied by rotating the second member 15 with respect to the first member 14 so that different sections of teeth 17,21 interlock with each other. This causes the ridge 27 in the second member 15 to be rotationally shifted and consequently causes a rotational shift in the orientation of the second shaft 11 when it is received in the first shaft 10. This type of change in alignment may be desirable if the user wishes to change the angle at which he holds the handle end 29 of the snow shovel for instance, while keeping the entire front edge of the shovel end 28 in contact with the ground. This would not be possible unless the alignment between the handle end 29 and shovel end 28 could be altered.

The collar member 13 is provided to secure the second shaft 11 to the first shaft 10 via the alignment means 12. The collar member is internally threaded to engage with threads 30 disposed on the external surface of the second member 15. The collar member 13 is internally tapered so that when it engages the projections 22 on the second member 15, the projections 22 are pressed against the second shaft 11. This frictional fit detachably connects the first and second shafts 10, 11 together and substantially prevents longitudinal movement of the second shaft 11 relative to the first shaft 10.

The adjustable shaft may be used in the following manner:

When the user wishes to assemble the adjustable shaft, he follows the steps of:
a) inserting the first member 14 onto the first shaft 10 and engaging the catches 20 of the first member in the holes 18 in the first shaft 10;
b) engaging the second member 15 with the first member 14 so that the teeth 21 of the second member interlock with the teeth 17 of the first member;
c) threading the ring member 16 onto the interlocked first and second members 14,15 to secure them in place;
d) inserting the second shaft 11 into the first shaft;
e) slidably moving the second shaft 11 into the first shaft 10 until the desired length of shaft is obtained;
f) slidably moving the collar member 13 along the second shaft 11 to engage the projections 22 of the second member 15;
g) threading the collar member 13 onto the second member 15 so that the projections 22 of the second member 15 are pressed against the second shaft 11.

If the user wishes to disassemble the adjustable shaft, he follows the steps of:
a) disengaging the collar member 13 from the second member 15 so that the projections 22 of the second member 15 are no longer pressed against the second shaft 11;
b) withdrawing the second shaft 11 from the first shaft 10.

If the user wishes to increase the length of the adjustable shaft, he follows the steps of:
a) disengaging the collar member 13 from the second member 15 so that the collar member 13 no longer presses the projections 22 of the second member 15 against the second shaft 11;
b) pulling the second shaft in a direction away from the end 19 of the first shaft 10, in the direction of arrow D as shown in FIG. 1, to the point that the desired length of shaft is obtained;
c) reengaging the collar member 13 with the second member 15 so that the collar member presses the projections 22 of the second member 15 against the second shaft 11, and thereby secures the second shaft 11 to the first shaft 10.

If the user wishes to decrease the length of the adjustable shaft, he follows the steps of:

a) disengaging the collar member 13 from the second member 15 so that the collar member 13 no longer presses the projections 22 of the second member 15 against the second shaft 11;
b) pushing the second shaft 11 in a direction towards the end 19 of the first shaft 10, in the direction of arrow A as shown in FIG. 1, to the point that the desired length of shaft is obtained;
c) reengaging the collar member 13 with the second member 15 so that the collar member presses the projections 22 of the second member 15 against the second shaft 11, and thereby secures the second shaft 11 to the first shaft 10.

Variations in the present invention will be obvious to those skilled in the art, and these obvious variations are contemplated to fall within the scope of this invention.

The embodiments of the invention in which an exclusive property or privilege is claimed are defined as follows:

1. An adjustable shaft for an implement having a hollow first shaft; a second shaft of lesser diameter than the first shaft, said second shaft being slidably receivable within the first shaft; an alignment means detachably connected to the first shaft, proximate one end thereof; the alignment means having a plurality of projections which extend away from the first shaft when the alignment means is mounted thereon; the projections being adapted to engage the second shaft when the second shaft is received within the first shaft; a collar member being slidably mounted on the second shaft, the collar member being adapted to engage the alignment means so that the collar member presses the projections of the alignment means against the second shaft when it is received in the first shaft, so that the first and second shafts are detachably connected together and longitudinal movement of the second shaft with respect to the first shaft is thereby substantially prevented; wherein the first shaft has a plurality of holes proximate the end of the first shaft to which the alignment means is connected; and the alignment means comprises:

a first member which is threaded on its external surface and which has a plurality of teeth on one end thereof; said first member also having a plurality of catches for engaging in the holes in the first shaft, so that when the first member is engaged in the holes, the teeth extend away from the first shaft;

a second member having a plurality of teeth on one end thereof for interlocking with the teeth of the first member; said second member also having a plurality of projections on the opposite end thereof for engaging the second shaft; and an internally threaded ring member for securing the first member and second member together when the teeth of the first and second members are interlocked; the ring member being adapted to thread onto the threaded external surface of the first member.

2. An adjustable shaft for an implement as defined in claim 1, wherein the second member has an internal, circumferential lip which rests on the end of the first shaft, to which the first member is connected, when the first member and second member are connected together and the catches of the first member are engaged in the holes in the first shaft.

3. An adjustable shaft for an implement as defined in claim 1, wherein the second member is externally threaded and the collar member is internally threaded for engagement with the second member.

4. An adjustable shaft for an implement as defined in claim 1 wherein the collar member is internally tapered so that when the collar member engages the projections on the second member, the projections are pressed against the second shaft.

5. An adjustable shaft for an implement as defined in claim 1, wherein the second shaft and the second member are configured to interlock with each other so that rotational movement of the second shaft with respect to the first shaft is substantially prevented.

6. An adjustable shaft for an implement as defined in claim 5, wherein the second shaft has an internal longitudinal groove and the second member has an internal longitudinal ridge for interlocking with said groove, so that when the alignment means is connected to the first shaft, rotational movement of the second shaft with respect to the first shaft is substantially prevented.

7. An adjustable shaft for an implement as defined in claim 6, wherein the orientation of the second shaft may be varied by rotating the second member with respect to the first member so that different teeth on the first and second members interlock with each other, thereby causing the ridge in the second member to be rotationally shifted relative to the first member, and consequently causing rotational shifting of the second shaft, relative to the first member, when it is received in the first shaft.

8. Method of increasing the length of an adjustable shaft for an implement having a hollow first shaft; a second shaft of lesser diameter than the first shaft, said second shaft being slidably receivable within the first shaft; an alignment means detachably connected to the first shaft, proximate one end thereof; the alignment means having a plurality of projections which extend away from the first shaft when the alignment means is mounted thereon; the projections being adapted to engage the second shaft when the second shaft is received within the first shaft; a collar member being slidably mounted on the second shaft, the collar member being adapted to engage the alignment means so that the collar member presses the projections of the alignment means against the second shaft when it is received in the first shaft, so that the first and second shafts are detachably connected together and longitudinal movement of the second shaft with respect to the first shaft is thereby substantially prevented; wherein the first shaft has a plurality of holes proximate the end of the first shaft to which the alignment means is connected; and where the alignment means comprises a first member which is threaded on its external surface and which has a plurality of teeth on one end thereof; said first member also having a plurality of catches for engaging in the holes in the first shaft, so that when the first member is engaged in the holes, the teeth extend away from the first shaft; a second member having a plurality of teeth on one end thereof for interlocking with the teeth of the first member; said second member also having a plurality of projections on the opposite end thereof for engaging the second shaft; and an internally threaded ring member for securing the first member and second member together when the teeth of the first and second members are interlocked; the ring member being adapted to thread onto the threaded external surface of the first member; said method comprising the steps of:
 a) disengaging the collar member from the second member so that the collar member no longer presses the projections of the second member against the second shaft;
 b) pulling the second shaft in a direction away from the end of the first shaft, to which the alignment means is connected, to the point that the desired length of shaft is obtained;
 c) re-engaging the collar member with the second member so that the collar member presses the projections of the second member against the second shaft and thereby secures the second shaft in the first shaft.

9. Method of assembling the adjustable shaft of an implement having a hollow first shaft; a second shaft of lesser diameter than the first shaft, said second shaft being slidably receivable within the first shaft; an alignment means detachably connected to the first shaft, proximate one end thereof; the alignment means having a plurality of projections which extend away from the first shaft when the alignment means is mounted thereon; the projections being adapted to engage the second shaft when the second shaft is received within the first shaft; a collar member being slidably mounted on the second shaft, the collar member being adapted to engage the alignment means so that the collar member presses the projections of the alignment means against the second shaft when it is received in the first shaft, so that the first and second shafts are detachably connected together and longitudinal movement of the second shaft with respect to the first shaft is thereby substantially prevented; wherein the first shaft has a plurality of holes proximate the end of the first shaft to which the alignment means is connected; and where the alignment means comprises a first member which is threaded on its external surface and which has a plurality of teeth on one end thereof; said first member also having a plurality of catches for engaging in the holes in the first shaft, so that when the first member is engaged in the holes, the teeth extend away from the first shaft; a second member having a plurality of teeth on one end thereof for interlocking with the teeth of the first member; said second member also having a plurality of projections on the opposite end thereof for engaging the second shaft; and an internally threaded ring member for securing the first member and second member together when the teeth of the first and second members are interlocked; the ring member being adapted to thread onto the threaded external surface of the first member; said method comprising the steps of:
 a) inserting the first member onto the first shaft and engaging the catches of the first member in the holes in the first shaft;
 b) engaging the second member with the first member so that the teeth of the first and second members interlock with each other;
 c) threading the ring member onto the interlocked first and second members to secure them in place;
 d) inserting the second shaft into the first shaft;
 e) slidably moving the second shaft into the first shaft until the desired length of shaft is obtained;
 f) slidably moving the collar member along the second shaft to engage with the projections of the second member;
 g) threading the collar member onto the second member so that the collar member presses the projections of the second member against the second shaft, thereby securing the second shaft to the first shaft.

* * * * *